United States Patent [19]

Hay, II

[11] 4,363,684

[45] Dec. 14, 1982

[54] METHOD FOR THE LAMINATION OF FOAM INCLUDING A REINFORCING SCRIM

[75] Inventor: Robert A. Hay, II, Midland, Mich.

[73] Assignee: The Dow Chemical Company, Midland, Mich.

[21] Appl. No.: 271,161

[22] Filed: Jun. 9, 1981

Related U.S. Application Data

[63] Continuation-in-part of Ser. No. 137,665, Apr. 7, 1980, abandoned, which is a continuation-in-part of Ser. No. 41,355, May 22, 1979, abandoned, which is a continuation-in-part of Ser. No. 925,081, Jul. 17, 1978, abandoned.

[51] Int. Cl.³ .............................................. B31F 1/00
[52] U.S. Cl. .................................. 156/201; 52/309.7;
52/309.8; 52/309.15; 52/309.16; 156/204;
156/303; 156/308.2; 156/308.4; 156/309.9;
156/322; 220/901; 428/247; 428/251;
428/306.6; 428/316.6

[58] Field of Search ............. 156/70, 308.2, 80, 308.4, 156/201, 309.9, 290, 322, 303, 204; 428/56, 251, 195, 313, 247, 315, 306.6, 316.6; 264/234, 271, 248, 345, 267; 220/901; 62/45; 52/309.4, 309.7, 309.8, 309.11, 309.15, 309.16

[56] References Cited

U.S. PATENT DOCUMENTS

| | | | |
|---|---|---|---|
| 3,000,276 | 9/1961 | Foulger | 404/82 |
| 3,411,969 | 11/1968 | Ragan et al. | 156/308.4 |
| 3,571,559 | 3/1971 | Becker et al. | 156/308.2 |
| 3,575,762 | 4/1971 | Goehring et al. | 156/309.9 |

FOREIGN PATENT DOCUMENTS

| | | | |
|---|---|---|---|
| 64002 | 3/1969 | Australia | 428/315 |
| 854518 | 11/1960 | United Kingdom | 156/308.2 |

Primary Examiner—John J. Gallagher
Attorney, Agent, or Firm—R. B. Ingraham

[57] ABSTRACT

Thermoplastic foam bodies are readily generally continuously laminated together wherein the joint therebetween contains a reinforcing scrim. Friction on each of the foam bodies is generally equalized by positioning the scrim relative to both major faces of the heating element employed for the lamination to obtain a desired degree of curvature in the laminate.

10 Claims, 7 Drawing Figures

METHOD FOR THE LAMINATION OF FOAM INCLUDING A REINFORCING SCRIM

This application is a continuation-in-part of application Ser. No. 137,665, filed Apr. 7, 1980, now abandoned, which is a continuation-in-part of application Ser. No. 41,355, filed May 22, 1979, now abandoned; which is a continuation-in-part of application Ser. No. 925,081, filed July 17, 1978 now abandoned.

Frequently, it is desired to laminate billets of synthetic resinous thermoplastic foam together by passing heated blade therebetween thereby heat-plastifying adjacent surfaces. The adjacent surfaces are then pressed together to provide a laminated billet of the desired size. For many processes, it is desirable to incorporate within such a laminate a reinforcing scrim such as a glass fiber reinforcing scrim. Such laminates are employed for the insulation of cryogenic vessels by the so-called spiral generation techniques. Such a technique is disclosed in U.S. Pat. Nos. 4,017,346 and 4,050,607. An apparatus for preparing laminates suitable for the spiral generation process is set forth in U.S. Pat. No. 4,049,852 while various configurations of laminates suitable for the spiral generation process are set forth in U.S. Pat. No. 3,919,034; 3,924,039; and 3,954,539, the teachings of which are herewith incorporated by reference thereto. Oftentimes, such laminates, after preparation, show a somewhat curved configuration along the longitudinal axis for a considerable period of time. The reason for this undesired curvature was not understood and when it occured it was frequently an undesired direction which necessitated extra mechanical manipulation of the billet or log in order to have it conform to the desired configuration. In thermal insulation for cryogenic applications, undesired mechanical stresses in the insulation should be avoided in order to minimize the possibility of the insulation cracking under thermal stress. One method of reducing curvature is to pass the scrim through the heating element; however, such a procedure often adds undesirable tension to the scrim.

It would be desirable if there were available an improved method for the lamination of synthetic resinous thermoplastic foam bodies while incorporating a reinforcing scrim therein.

It would also be desirable if there were available an improved method for the preparation of thermoplastic foam laminates wherein the possibility of undesired bowing or curvature were avoided.

It would also be desirable if there were available an improved method for the thermal lamination of thermoplastic foams which required relatively simple equipment which does not add undesirable tension to the scrim.

These benefits and other advantages in accordance with the present invention are achieved in a generally continuous method for the preparation of an elongate laminate of synthetic resinous thermoplastic foam body wherein adjacent foam surfaces of adjacent foam bodies are heated by means of a generally planar heating element having first and second opposed heating surfaces to a temperature sufficient that on contact of the adjacent foam surfaces and cooling thereof, a rigid bond is achieved between the bodies incorporating a reinforcing scrim therein, the improvement which comprises positioning the scrim relative to the major surfaces of the planar heating element during the heating of the adjacent foam surfaces to thereby obtain a laminate exhibiting a desired degree of curvature.

The method of the present invention will become more apparent from the following specification taken in connection with the drawing wherein.

Figure 2:
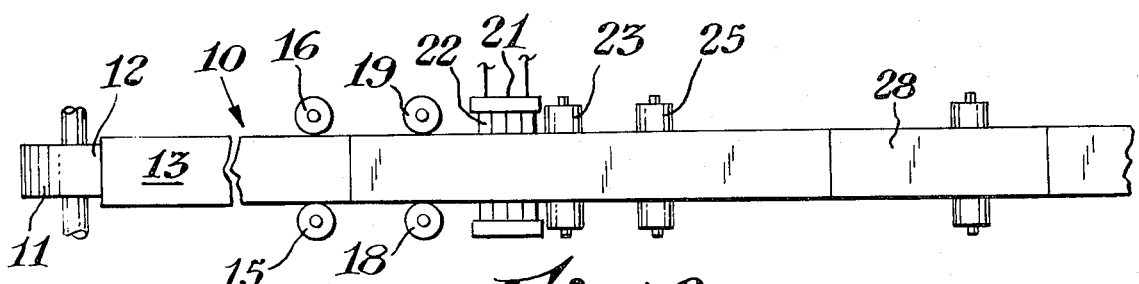
FIG. 2 is a top view of the lamination operation of FIG. 1.
Figure 1:
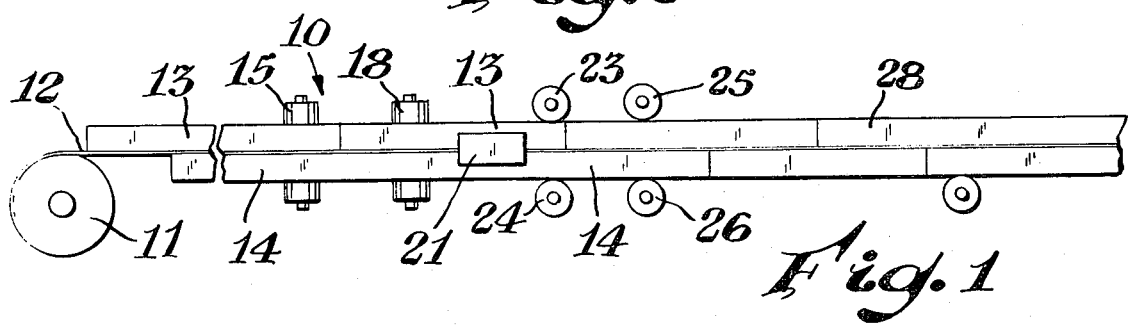
FIG. 1 is a schematic side view of lamination in accordance with the invention.

In FIGS. 1 and 2 there is schematically depicted a laminating apparatus generally designated by the reference numeral 10. The apparatus 10 comprises in cooperative combination of a frame and support means (not shown). Supported on the frame is a reinforcing scrim supply roll 11 dispensing therefrom reinforcing scrim 12. The reinforcing scrim 12 extends between a first series of foam synthetic resinous bodies 13 arranged in end-to-end relationship and a second series of bodies 14 oppositely disposed to the bodies 13. The bodies 13 and 14 have adjacent surfaces with a scrim 12 disposed therebetween. A first pair of feed rolls 15 and 16 forward the bodies 13, 14 and the scrim 12 towards a second pair of pressure or feed rolls 18 and 19. Adjacent the feed rolls 18 and 19 and remote from the feed rolls 15 and 16 is a laminating blade or platen assembly 21. It is preferred to support the scrim 12 between roll 11 and platens assembly 21 with a smooth sheet metal plate. The assembly 21 has a thin heated blade 22 which passes between the bodies 13 and 14 and raises the temperature of the adjacent surfaces of the bodies 13 and 14 to a temperature sufficient to heat-plastify the foam. The bodies 13 and 14 are removed from the region of the heating platen 21 by draw rolls 23 and 24 and a second pair of draw rolls 25 and 26. The draw rolls 23–25 force the heated foam surfaces together, thereby generally encapsulating the scrim therebetween in heat plastified collapsed foam. The heated foam surfaces on cooling provide a rigid laminate 28 having a reinforcing scrim generally centrally disposed therein.

Figure 3:
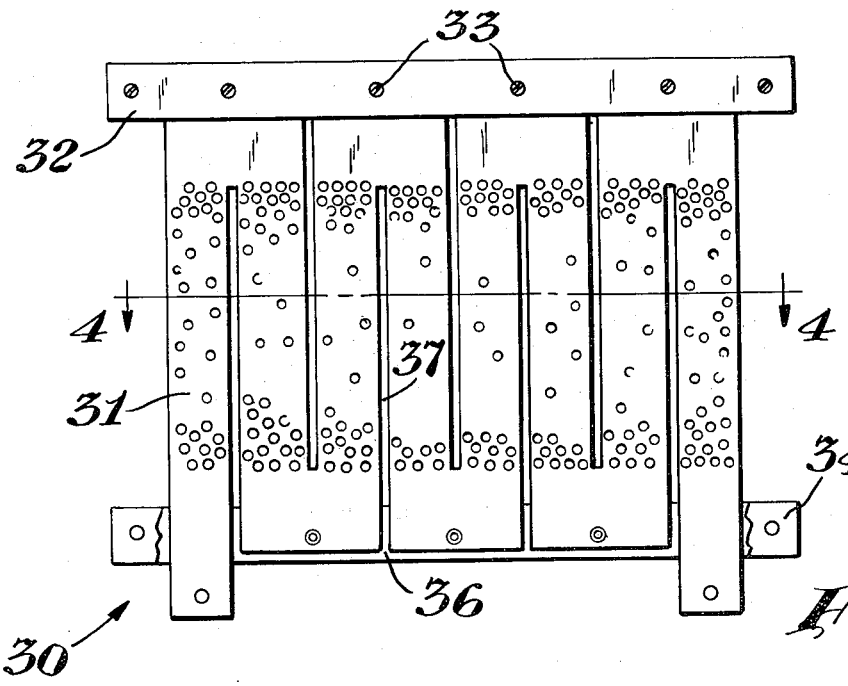
FIG. 3 is a partly-disassembled heating platen for the practice of the method of the invention.

In FIG. 3 there is depicted a view of a heating platen generally designated by the reference numeral 30. The platen 30 has an electrical resistance heating element 31 of generally flat rectangular serpentine configuration. The heating element 31 has been perforated in regions where the maximum generation of heat is desired. Serpentine electrical resistance heating elements are well known in the art and are set forth in U.S. Pat. Nos. 1,299,265; 1,975,410; and 3,431,075, the teachings of which are herewith incorporated by reference thereto. The heating element 31 is supported within a first frame or support section 32 and is insulated therefrom by insulating members (not shown). The heating element is affixed to the support member 32 by means of screws 33. The screws 33 are electrically insulated from the heating element 31. Remotely disposed from the support member 32 is a support member 34, the top half of the member 34 being removed. The heating element 31 is electrically insulated from the support member 34 by means of insulating material 36 which beneficially is a glass cloth-siloxane resin laminate.

Figure 4:
FIG. 4 is an end view of the platen of FIG. 3 showing the location of a reinforcing scrim relative thereto.

An end view of the resistance element 31 is depicted in FIG. 4 wherein reinforcing scrim portions 12a and 12b are shown adjacent the major heating faces of the element 31. Beneficially, by employing a two-part reinforcing scrim comprising portions 12a and 12b and disposing the portions 12a and 12b on opposing faces of the heating element 31, the frictional drag on adjacent portions of foam being laminated is approximately equalized and the tendency for the resultant laminate to warp is substantially reduced.

Figure 5:
FIG. 5 is an end view of an alternate scrim arrangement of the present invention.

In FIG. 5 there is depicted an end view of an alternate scrim arrangement and element suitable for the practice of the present invention. The element 31 is disposed within a scrim 12c which is folded lengthwise and contacts the major heating faces of the element 31.

Figure 6:
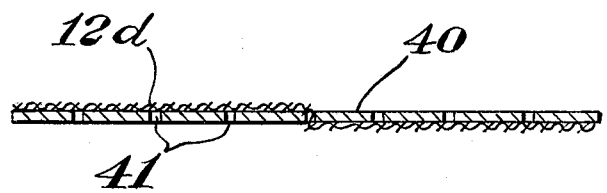
FIGS. 6 and 7 are alternative scrim arrangements of the present invention.

FIG. 6 depicts a sectional view through a resistance element 40 wherein a reinforcing scrim 12d is shown passing through a generally centrally transversely disposed slot 41 of the element 40. Beneficially, by passing the reinforcing scrim 12d through the heating element 40, the frictional drag on adjacent portions of foam being laminated is approximately equalized and the tendency for the resultant laminate to warp is substantially reduced.

Figure 7:
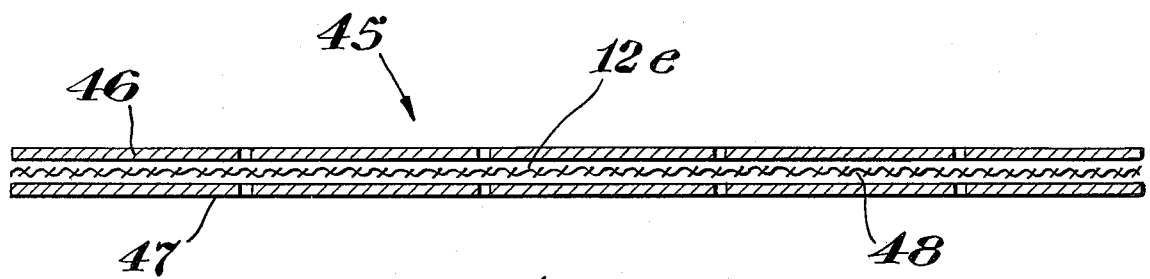

In FIG. 7, there is depicted a sectional view of an alternate heating element suitable for the practice of the present invention. The element is designated by the reference numeral 45. The element 45 comprises a first serpentine electrical resistance heater 46 and a like heating element 47 in spaced parallel face-to-face relationship with element 46. Elements 46 and 47 are separated by a plurality of spacers 48 of like discoidal configuration. The spacers 48 are disposed at the terminal ends or reverse bends in the heating element and correspond in location generally to the support members 32 and 34 of FIG. 3. Thus, the heating element of FIG. 7 is, in essence, two heating elements such as are depicted in FIGS. 3 and 4 but are in spaced-apart relationship providing a path for a reinforcing scrim 12d to be passed therebetween. Desirably, heating elements for use in the practice of the invention have major opposed parallel faces and have a thickness not greater than one-quarter inch and beneficially 3/16 of an inch or less.

In the practice of the present invention, heating elements such as the element 31 of FIG. 3 beneficially is prepared from perforated stainless steel sheet having a thickness of about ⅛ inch. For the lamination of polystyrene foam having a density of about two pounds per cubic foot, heating elements such as heating element 31 are heated to a temperature, as indicated by a thermocouple manually positioned on the surface of the heater, to a temperature of about 600° F. A convenient source of electrical power to such heaters is an alternating current or direct current welding power supply.

The method of the present invention is useful with any synthetic resinous thermoplastic foam which is heat-weldable and provides laminates having a minimum curvature. The reinforcing scrim may be wider, narrower or equal to the faces of the foam bodies being laminated depending on the desired end use. The scrim may be continuous as depicted in FIGS. 1 and 2 or a plurality of overlapping joined lengths. Conveniently, such short lengths are joined at each end of a scrim section by transversely extending pressure sensitive tape or other desired means. In the preparation of elongate laminates for use in the application of thermal insulation by the so-called spiral generation process, usually the desired curvature approximates zero curvature or curvature in the direction in which the strip is to be applied to a vessel being insulated, is less than the curvature of the vessel wall to which it is applied.

The present invention is an improvement in the art of laminated synthetic resinous foam bodies. The present invention is particularly suited for the preparation of laminated billets of synthetic resinous thermoplastic foam for use in the insulation of cryogenic vessels. A typical laminate might comprise four pieces of foam; for example, a 2 by 8 inch plank laminated to four 2 by 6 inch planks wherein the 2 by 6 inch planks are stacked four high, and one of the edges of each 2 by 6 inch plank is heat sealed to one face of the 2 by 8 inch plank to provide an 8 inch by 8 inch square billet having a reinforcing scrim encapsulated in the sealed inner face of the 2 by 8 inch plank. A simpler billet might comprise two 4 by 8 inch planks in welded face-to-face engagement with a reinforcing scrim therebetween.

The applicant believes that by passing the scrim through the blade or heating element, frictional drag on bodies being laminated is equalized and the heating of the scrim is immaterial. The bond between the foam bodies is obtained by heat plastifying adjacent foam faces and contacting such heated foam faces is solely responsible for the bond, and heating of the scrim has little or no significance. When a foam body is pushed or pulled through a heating and laminating section and the foam bodies to be laminated move relative to a fixed blade, there is friction between the faces of the foam bodies contacting the fixed blade. In general, for such lamination a solid blade has been used, and when a reinforcing scrim is encapsulated in the weld line, one has the choice of placing it on one side or the other of the heating element. Therefore, on one side of the blade, the foam is in direct contact with the heating element and on the other side of the blade the reinforcing scrim is in direct contact with the blade, and therefore the friction force is different on either side of the heating element. By positioning the scrim relative to the major surfaces of the planar heating element, some control of the curvature is obtained.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a generally continuous method for the preparation of an elongate laminate of synthetic resinous thermoplastic foam body incorporating a reinforcing scrim therein wherein adjacent foam surfaces of adjacent foam bodies are heated by means of a generally planar heating element having first and second opposed heating surfaces to a temperature sufficient that on contact of the adjacent foam surfaces and cooling thereof, a rigid bond is achieved between the bodies, the improvement which comprises positioning the scrim relative to the major surfaces of the planar heating element during the heating of the adjacent foam surfaces to thereby obtain a laminate exhibiting a desired degree of curvature.

2. The method of claim 1, wherein the scrim is in the form of a single scrim folded over the heating element.

3. The method of claim 1, wherein the scrim comprises two separate portions, a portion being disposed on each of the two major heating surfaces.

4. The method of claim 2, wherein the scrim is longitudinally folded.

5. The method of claim 1, wherein the element is a generally flat sheet in the configuration of a serpentine resistance heater.

6. The method of claim 1, wherein the scrim is passed generally centrally through the heating element.

7. The method of claim 1, wherein the scrim is passed from the first side to the second side of the heating element.

8. The method of claim 1, wherein the heating element comprises two spaced-apart planar members and the scrim is passed therebetween.

9. In a generally continuous method for the preparation of an elongate laminate of synthetic resinous thermoplastic foam body incorporating a reinforcing scrim therein wherein adjacent foam surfaces of adjacent foam bodies are heated by means of a generally planar heating element having first and second opposed heating surfaces to a temperature sufficient that on contact of the adjacent foam surfaces and cooling thereof, a rigid bond is achieved between the bodies, the improvement which comprises passing the reinforcing scrim, the scrim being in the form of one scrim folded over the heating element or the scrim comprising two separate portions, a portion disposed on each of the major heating surfaces, over the major surfaces of the planar heating element during the heating of the adjacent foam surfaces to thereby obtain a laminate exhibiting a desired degree of curvature.

10. In a generally continuous method for the preparation of an elongate laminate of synthetic resinous thermoplastic foam body incorporating a reinforcing scrim therein wherein adjacent surfaces of adjacent foam bodies are heated by means of a generally planar heating element to a temperature sufficient that on contact of the adjacent surfaces and cooling thereof, a rigid bond is achieved between the bodies therein, the improvement which comprises passing the reinforcing scrim through the planar heating element during the heating of the adjacent foam surfaces to thereby obtain a laminate exhibiting a desired degree of curvature.

* * * * *